(No Model.)
E. KUCHENMEISTER.
SYSTEM OF ELECTRICAL DISTRIBUTION WITH STORAGE BATTERIES.
No. 530,432. Patented Dec. 4, 1894.
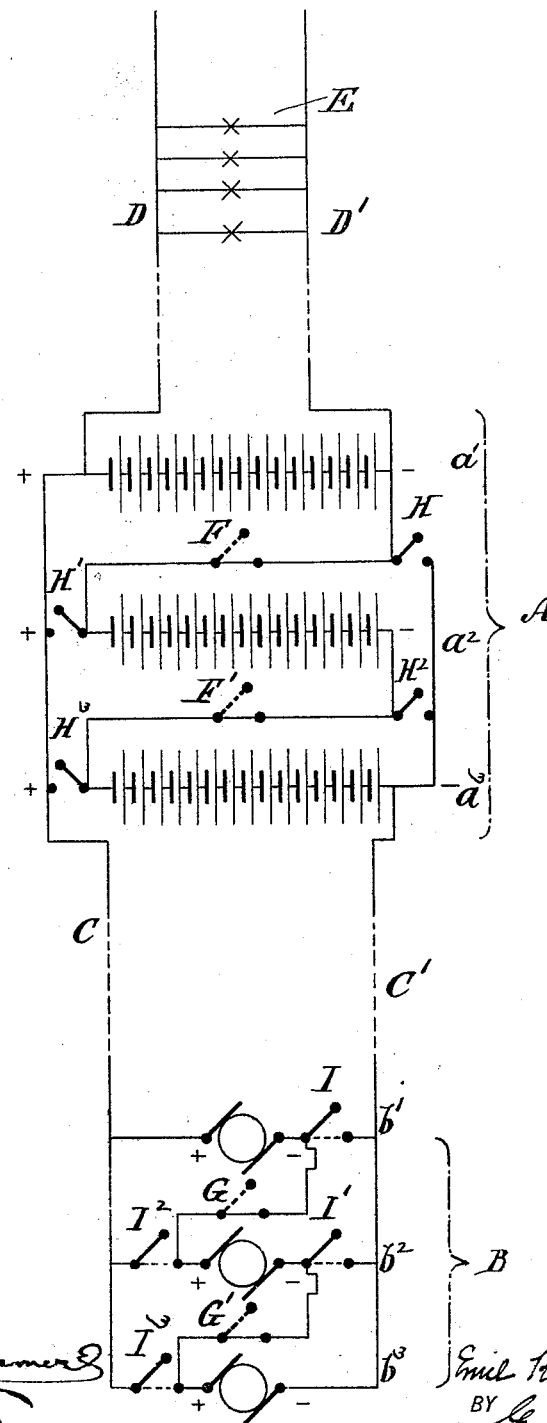

UNITED STATES PATENT OFFICE.

EMIL KUCHENMEISTER, OF BERLIN, GERMANY, ASSIGNOR TO SIEMENS & HALSKE, OF SAME PLACE.

SYSTEM OF ELECTRICAL DISTRIBUTION WITH STORAGE-BATTERIES.

SPECIFICATION forming part of Letters Patent No. 530,432, dated December 4, 1894.

Application filed November 25, 1892. Serial No. 452,980. (No model.) Patented in Germany March 18, 1890, No. 56,525; in Switzerland November 22, 1890, No. 3,146; in Austria November 24, 1890, No. 52,749, XLI, 742; in Hungary November 24, 1890, No. 6,439, XXV, 678; in Italy November 26, 1890, No. 28,645; in Belgium November 26, 1890, No. 92,878, and in France November 27, 1890, No. 209,833.

*To all whom it may concern:*

Be it known that I, EMIL KUCHENMEISTER, a subject of the King of Bavaria, residing at the city of Berlin, in the German Empire, have invented new and useful Improvements in Systems of Electrical Distribution with Storage-Batteries, (for which I have obtained Letters Patent as follows: in Germany, No. 56,525, dated March 18, 1890; in France, No. 209,833, dated November 27, 1890; in Belgium, No. 92,878, dated November 26, 1890; in Italy, No. 28,645, dated November 26, 1890; in Switzerland, No. 3,146, dated November 22, 1890; in Austria, No. 52,749, XLI, 742, dated November 24, 1890, and in Hungary, No. 6,439, XXV, 678, dated November 24, 1890,) of which the following is a specification.

My invention relates to a system of electrical distribution in which there is interposed between the source of electric energy and the external circuit, a number of storage batteries.

The object of the present invention is to effect the charging of the storage batteries at a higher potential than their discharge, and consists in such an arrangement of the system as a whole, as not only suits this purpose, but also permits of charging and discharging being carried on simultaneously.

The accompanying diagram serves to illustrate my invention.

A is an accumulator or storage battery made up of a sufficient number of separate cells to be able to produce, on discharge, a potential difference which is considerably greater (in the present case, three times) than the normal difference of potential in the external circuit.

The battery A is shown as divided into three equal parts or sections $a'$ $a^2$ $a^3$. Each section may consist of a number of cells connected in series, so as to give the required potential between the conductors of the external circuit; or a number of sets of cells, each set consisting of the required number of batteries in series, may be connected in parallel to the external circuit.

B represents the plant for generating the electrical energy, and in the present case is shown to consist of the dynamo-electric machines $b'$ $b^2$ $b^3$, corresponding to the number of divisions or sections of the storage battery.

C C' represent the supply conductors from the generating plant to the storage batteries and to the conductors of the external circuit D D'.

E represents lamps or other translating devices arranged in parallel of the external circuit.

The dynamo-electric machines are arranged to be coupled in series with each other through suitable conductors, or in parallel of the supply conductors C C', by means of suitable switches, as hereinafter set forth and described. The same is true of the storage or accumulator battery.

The plant for generating the electrical energy is preferably divided into the same number of sections,—that is separate machines,—as there are separate sections of the storage battery. In many instances, however, it will suffice, if the storage battery has to be divided into $n$ parts, to divide the generating plant into two parts only, one of which is capable of producing a potential difference equal to the charging potential difference of $\frac{1}{n}$th of the charging potential difference of the whole battery, while the other produces a potential difference which is $\frac{n-1}{n}$th of the charging potential difference of the whole battery. It is, of course, necessary that the potential difference of the generating plant should so far exceed the potential difference of the battery as to make up for the loss of potential in the conductors.

The above described arrangement may be operated as follows: During those hours of the day, when the demand on the external circuit is small, the parts of the battery $a'$ $a^2$ $a^3$ are joined up in series by closing the switches F F', and similarly the dynamos of the generating plant $b'$ $b^2$ $b^3$ are likewise joined up in series by closing the switches G G', and the battery is charged at a potential difference which, in the present instance, is three times that of the external circuit (always taking into account the difference between charging and discharging current, and the loss in the charging conductors). While all the sections of the battery are thus being charged, the section $a'$ supplies the required current to the external circuit, and should be so arranged as to be able to satisfy this demand; and as this current is part of the total current of the generators and is drawn from the charging current, the part $a'$ of the storage battery will not receive and store so much of the current as is the case with $a^2$ and $a^3$. Accordingly, in designing the plant, the relative capacity of the sections of the storage battery $a'$ and $a^2\ a^3 \ldots a^n$ may be different. As the day advances, and the demand for current increases, the second section $a^2$ of the storage battery may be cut in parallel between the supply conductors C C' by closing the switches H H' H² and opening the switch F; and, as further demand for current is made, the remaining section $a^3$ of the storage battery may be cut in parallel by closing the switch H³ and opening the switch F', when the discharge of the whole battery to the external circuit takes place. If desired, the generating plant can now also transmit current direct to the external circuit. This can be done by coupling the machines $b'\ b^2\ b^3$ in parallel with the external circuit by closing the switches I I' I² I³ and opening the switches G G', or that part of the generating plant which, as above explained, gives the potential difference $\frac{n-1}{n}$, is switched off, and the part of the generating plant left at work is confined to that which gives the potential difference $\frac{1}{n}$.

In the system described, in the first case, the machines, say $b^2\ b^3$, would be switched off and a current of the required potential would be furnished by the machine $b'$.

If it was required to transmit to the external circuit, during the discharge of the battery, a greater portion of the total current than $\frac{1}{n}$th, this can be accomplished by increasing the speed of the dynamo, or its magnetic field, or in any other way to produce the desired result.

As before stated, it is not necessary with the arrangement of distribution described, that all of the sections $a'\ a^2\ a^3$ of the storage battery and $b'\ b^2\ b^3$ of the generating plant should always be joined up either in parallel or in series. On the contrary, the parallel or series connection can be made step by step, as described, in accordance with the increasing or decreasing consumption of current in the external circuit.

So long as the batteries are being charged, the section $a'$, which is permanently connected to the external circuit, will, as previously stated, receive less current than the other sections $a^2\ a^3$, since a portion of that current which traverses the sections $a^2\ a^3$ serves to supply the lamps or translating devices in the external circuit. When the discharge begins, and the section $a^2$ is put in parallel with the section $a'$, the section $a^2$ will not receive so much current as the sections $a^3\ a'$. If it be assumed that the coupling in parallel of the storage battery sections takes place by $n$ successive steps, then each section of the battery will receive fewer "ampère-hours" than the section denoted by the letter "$a$," accompanied by the next higher index, $(a^{n-3},\ a^{n-2},\ \&c.)$ If more than two sections of the battery are to be connected at the same time in parallel and in series, then the above considerations naturally apply to these groups only. The same consideration applies also to the discharge, for, as soon as the succeeding section is connected in parallel to the preceding section of the storage battery, the discharge of both will automatically divide itself proportionally to the charge.

The division of the generating plant must always depend upon the division of the storage battery, so that for each step in the parallel connection of the storage battery, a connection of the dynamos can be made, which will produce a potential difference corresponding to the potential difference required by the arrangement of the storage battery.

In carrying my invention into effect, I may use in connection with section $a'$ of the storage battery, a cell regulating switch of the usual construction, and I may also, for facility of operation, arrange the different switches to be operated automatically by electricity.

It will be obvious to those to whom this specification is addressed that my improved system will be applicable to both two and multiple wire systems.

I have not given any extended description, nor delineated various details in connection with my system, as they will be sufficiently obvious to those skilled in the art.

I claim as my invention—

1. In a system of electrical distribution, the combination of a current generating plant, an external circuit and the translating devices therein, a storage battery divided into uniform sections and having one of said sections connected permanently across the external circuit, and means for connecting the remaining sections in series with the first section or in parallel with it across the external circuit when desired.

2. In a system of electrical distribution, the combination of a plurality of generators, an external circuit and the translating devices therein, a storage battery interposed between said external circuit and said generators, and said storage battery divided into as many uniform sections as there are separate generators, means for coupling said generators in series with each other, and in series with the sections of the storage battery, and means for coupling one section of the storage battery permanently in circuit with the conductors of the external circuit and the other sections of the storage battery in parallel of said conductors, when desired.

3. In a system of electrical distribution involving a plurality of uniform sections of storage battery, an energizer for each section of battery, each of said energizers having a potential equal to its respective battery sections; working conductors; and means for coupling the initial battery section in parallel of the working conductors and the remaining battery sections successively in series or in parallel with said initial section in accordance with the fluctuations in the potentials of the working conductors.

4. A system of electrical distribution involving a plurality of uniform sections of storage battery, an energizer for each section of battery, each of said energizers having a potential equal to its respective battery section; working conductors; and means for coupling the initial battery section in parallel of the working conductors and the remaining battery sections successively in series or in parallel with said initial section in accordance with the fluctuations in the potentials of the working conductors; and for adjusting the connections of said energizers with said battery section to maintain the potentials of the battery sections and their respective energizers equal.

In testimony whereof I have affixed my signature in the presence of two witnesses.

EMIL KUCHENMEISTER.

Witnesses:
   A. NISSEN,
   A. ROTTERSHAUSSEN.